United States Patent [19]

Swank

[11] Patent Number: 5,608,967
[45] Date of Patent: Mar. 11, 1997

[54] METHOD OF MAKING PISTON FOR AN AIRCRAFT BRAKE WITH HONEYCOMB INSULATED PISTON HEAD

[75] Inventor: John P. Swank, Troy, Ohio

[73] Assignee: The B. F. Goodrich Company, Akron, Ohio

[21] Appl. No.: 489,528

[22] Filed: Jun. 12, 1995

Related U.S. Application Data

[60] Division of Ser. No. 192,230, Feb. 4, 1994, Pat. No. 5,538,109, which is a continuation-in-part of Ser. No. 623,862, Dec. 4, 1990, abandoned.

[51] Int. Cl.$^6$ .................................................. B21D 39/00
[52] U.S. Cl. .................. 29/888.045; 29/509; 428/593
[58] Field of Search ................................ 29/457, 469.5, 29/888.04, 888.042, 888.044, 888.045, 509; 428/593; 188/264 G, 71.6; 92/176

[56] References Cited

U.S. PATENT DOCUMENTS

| | | |
|---|---|---|
| 1,719,215 | 7/1929 | Faroy et al. . |
| 1,857,077 | 5/1932 | Adamson ................................ 92/176 |
| 2,058,741 | 10/1936 | Taylor . |
| 3,435,935 | 4/1969 | Warman ................................ 428/593 |
| 3,995,721 | 12/1976 | Chambers . |
| 4,067,670 | 1/1978 | Goloff . |
| 4,147,241 | 4/1979 | Preniczny et al. . |
| 4,471,028 | 9/1984 | Kimura et al. ......................... 428/593 |
| 4,503,950 | 3/1985 | Anderson . |
| 4,531,502 | 7/1985 | Muzuhara . |
| 4,537,289 | 8/1985 | VonGrunberg et al. . |
| 4,603,760 | 8/1986 | Myers . |
| 4,848,291 | 7/1989 | Kawamura . |
| 5,024,369 | 6/1991 | Froes et al. ........................... 428/593 |
| 5,107,968 | 4/1992 | Delpassand ........................ 188/264 G |

FOREIGN PATENT DOCUMENTS

| | | | |
|---|---|---|---|
| 3115740 | 11/1982 | Germany .............................. 188/71.6 |
| 255552 | 10/1988 | Japan . |
| 95756 | 4/1990 | Japan . |
| 1153095 | 4/1985 | U.S.S.R. ............................. 29/888.04 |

*Primary Examiner*—David P. Bryant
*Attorney, Agent, or Firm*—Joseph Januszkiewicz

[57] ABSTRACT

An aircraft brake assembly with stators and interleaved rotors with a piston support and cylinders mounted thereon for cooperative action by pistons slidably mounted therein for brake actuation wherein each piston has a piston head with a honeycomb insulator structure composed of cells made of longitudinally extending thin strips of deformed thin strips with non-coplaner surfaces that are parallel to the central axis with a thin cap on one of the end edges and a backup disc contacting the other end edges and to the method of making such honeycomb structure.

4 Claims, 3 Drawing Sheets

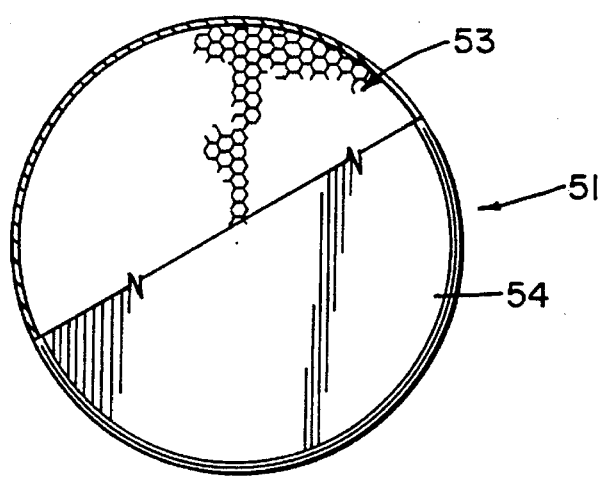
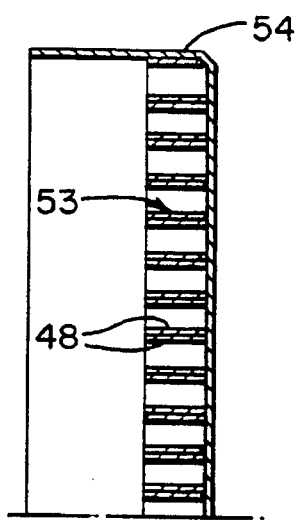
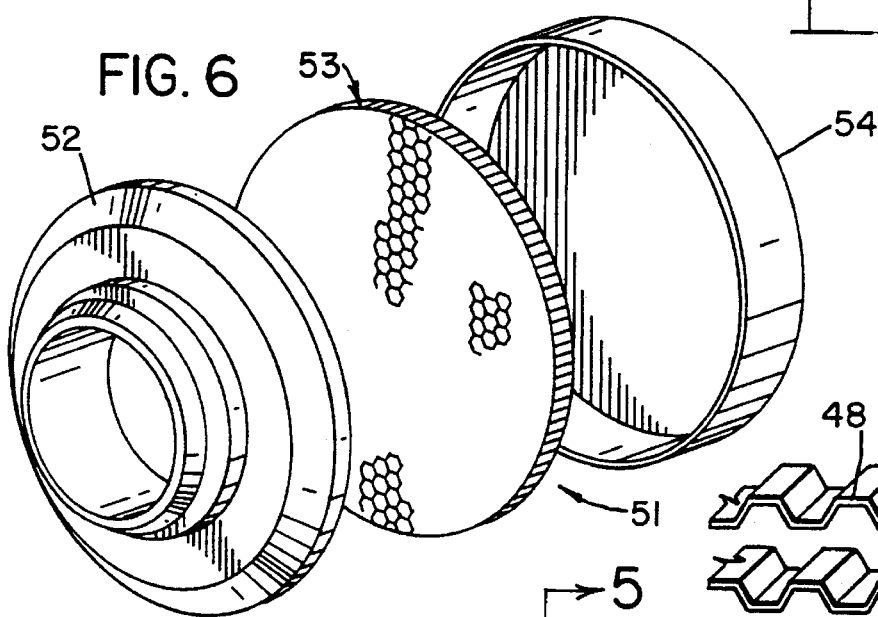
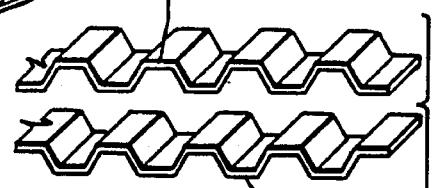
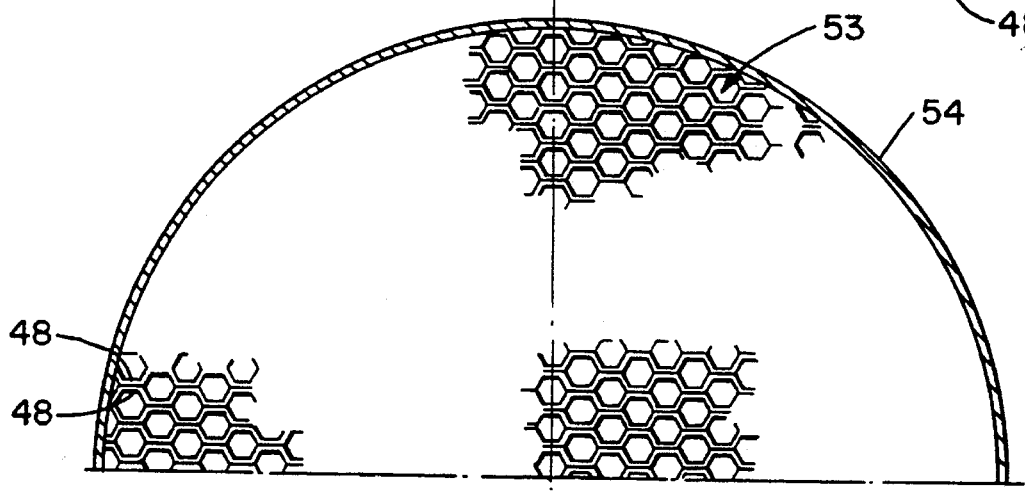

METHOD OF MAKING PISTON FOR AN AIRCRAFT BRAKE WITH HONEYCOMB INSULATED PISTON HEAD

This is a division of application Ser. No. 08/192,230 filed Feb. 4, 1994, now U.S. Pat. No. 5,538,109, which is a continuation-in-part application of application Ser. No. 07/623,862, filed Dec. 4, 1990, now abandoned.

This invention relates to a friction aircraft braking system and more particularly to a new and improved piston for use in an aircraft wheel and brake assembly and to the method of making such structure.

During the braking of an aircraft, a plurality of alternately splined stator and rotor brake discs are brought into axial frictional engagement with each other (brake stack) generating considerable heat within such braking elements and the adjacent structures. The frictional energy of the braking action is converted into heat within such brake stack. The brake actuating elements such as the piston heads are in direct contact with the end braking disc and it is important to provide some means to limit the heat absorption to protect the brake actuating elements particularly the brake fluid which actuates the pistons. The piston head itself encounters the same high temperature as the braking discs and insulators are therefore used within the pistons to insulate the hydraulic actuating fluid from these high temperatures as much as possible. In addition to the piston insulating the fluids, it is important to reduce the overall weight of the piston structure to maintain overall good fuel efficiency. Weight reduction is a critical factor. Where the insulation properties of the piston and the piston head do not provide a good thermal barrier, the hydraulic piston actuating fluid can expand disproportionally and cause damage to the structure. In addition, the heat build-up can cause an undesirable molecular structural change in the hydraulic fluid resulting in the fluid becoming corrosive and degrading its properties. This is particularly undesirable where high energy stops such as aborted take-offs occur.

It is an object of this invention to provide a piston structure with insulator means to properly isolate the piston and its component parts from the heat energy and to reduce the heat effect on the hydraulic fluids. This is achieved by utilizing a unique honeycomb structure directly behind a thin cap member that is the immediate front portion of the piston to provide a more efficient thermal barrier between the heat sink of the brake stack and the hydraulic aircraft braking fluids while maintaining a low weight structure. Such structure reduces the amount of thermal energy that can be transferred by conduction through the piston head while giving excellent compressive strength to weight ratio which is extremely important in aircraft brake assemblies where reduction of weight is essential. It is a further object of this invention to make the honeycomb structure from thin longitudinally extending strips of metal by deforming the longitudinally extending strip and thence joining them together to form cells with non-coplanar walls whose one end edges abut a thin cap to form the head end of a piston which provides excellent compressive strength to weight ratio while giving excellent heat insulator protection.

SUMMARY OF THE INVENTION

The present invention is directed to an aircraft piston structure used in a multiple disc brake assembly wherein a wheel member has axial splines engaging rotor discs which are interleaved with stator discs that are splined to a torque tube. The torque tube is secured to a hub and piston housing which in turn supports a plurality of pistons whose head has a thin cap supported by a honeycomb structure supported by a backup disc. The honeycomb wall construction and its method is such that it has excellent compressive strength to weight ratio while also providing excellent insulating properties. The method employs the use of longitudinally extending metal strips that are thin in cross-section. The thin step is deformed at longitudinally spaced portions along its running length and then assembled them by joining certain of the deformed strip faces together to provide a honeycomb cell structure whose walls are extremely thin compared to the cell formed, yet provide excellent compressive strength with good insulation properties.

BRIEF DESCRIPTION OF THE DRAWINGS

FIG. 3 is a fragmentary front elevational view of an insulator taken on line 3—3 of FIG. 2.

FIG. 4 is fragmentary front elevational view of the insulator shown in FIG. 3 enlarged greater than the actual size of the structure to more fully disclose the honeycomb structure;

FIG. 5 is a side elevational view in cross section of the insulator taken on line 5—5 of FIG. 4;

FIG. 6 is an exploded view of the piston head illustrating the honeycomb insulator and the thin cap member.

FIG. 7 is an enlarged isometric view of the honeycomb structure.

DETAILED DESCRIPTION

Figure 1:
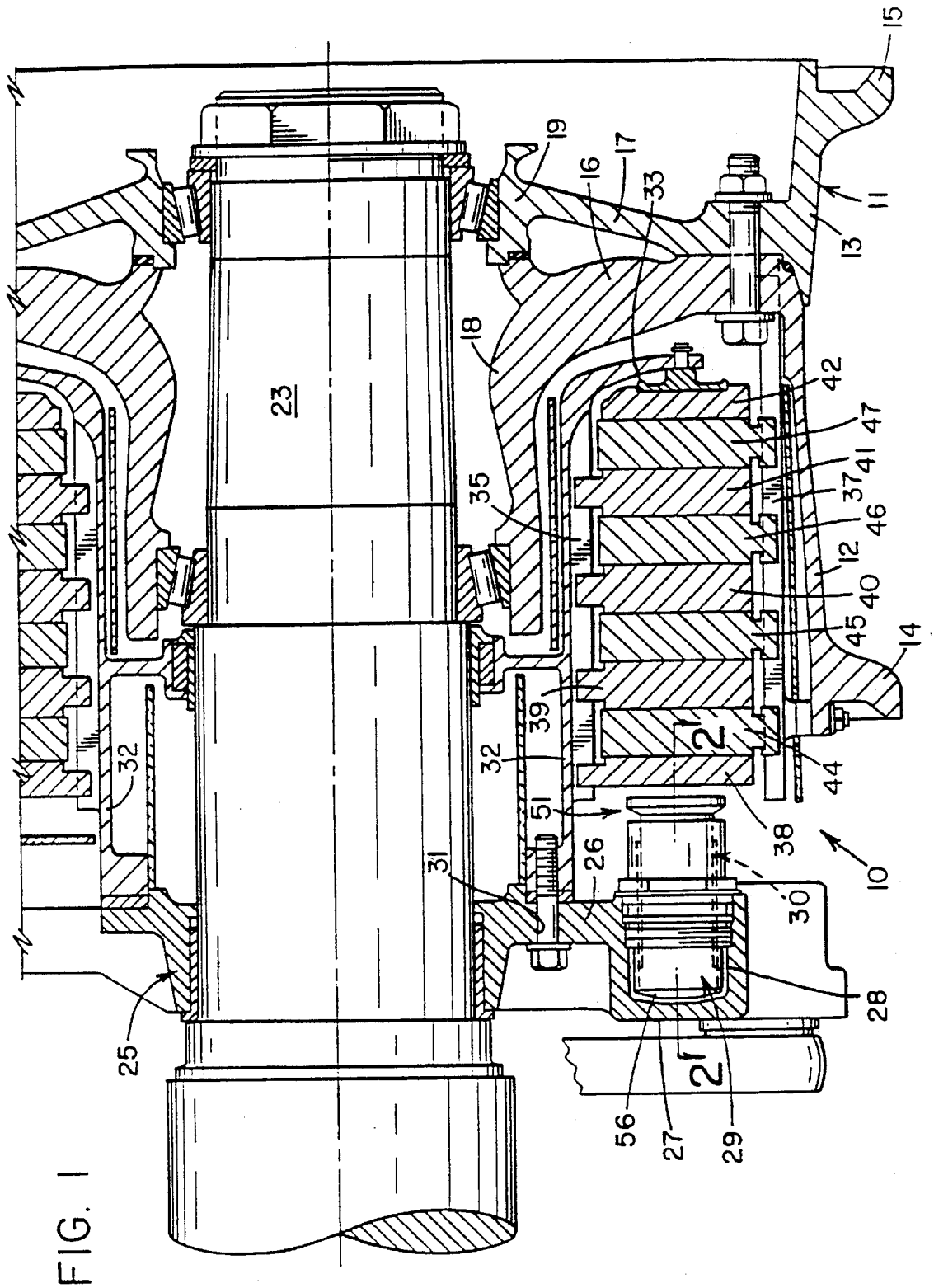
FIG. 1 is a fragmentary cross-sectional view of an aircraft brake assembly embodying the invention as mounted in an aircraft installation.

Referring to the drawings, wherein like reference numerals designate like or corresponding parts throughout the several views, there is shown in FIG. 1 a friction brake mechanism 10 for use with a cylindrical wheel 11 having matching wheel sections 12 and 13. Each of the wheel sections 12 and 13 has a rim 14 and 15, web member 16 and 17, and hub members 18 and 19. The wheel sections 12 and 13 are fastened together by suitable bolts disposed in aligned bores within web members 16 and 17 to form an integral unit therewith.

The hub members 18 and 19 are supported for rotation on suitable bearings which are mounted on a nonrotatable axle member 23. Mounted on axle member 23 is a hub 25, which hub 25 has a radially extending flange 26 that supports a piston housing 27. Piston housing 27 has a plurality of circumferentially spaced bores 28 that receives cylinders 29 within which are slidably mounted pistons 30. Flange 26 has a plurality of circumferentially spaced bores 31 to provide means for bolts to secure a torque tube or torque tube member 32 thereto. Torque tube 32 has an annular and radially outwardly extending reaction plate or reaction member 33. The reaction plate 33 may be made integral with the torque tube member 32 or may be made as separate annular piece and suitably connected to the torque tube or torque tube member 32.

Torque tube 32 has a plurality of circumferentially spaced splines or spline members 35 which are axially extending. Wheel section 12 has a plurality of circumferentially spaced ribs or splines 37 on its inner peripheral surface, which may be cast therein or may be machined to provide an integral type rib or spline for the brake assembly.

Spline members 35 support an axially nonrotatable end disc or pressure plate 38 and inner nonrotatable discs 39, 40 and 41. All of such (stator discs) nonrotatable discs 38, 39, 40 and 41 have slotted openings at circumferentially spaced locations on the inner periphery for captive engagement by the spline members 35 as is old and well known in the art. Such discs 38, 39, 40 and 41 constitute the stators for friction brake 10. An annular disc or annular braking element 42 is suitably connected to the reaction plate 33 and acts in concert with the stator discs 38, 39, 40 and 41.

A plurality of axially spaced discs 44, 45, 46 and 47 interspaced or interleaved between the stator discs 38 through 42, have a plurality of circumferentially spaced openings along their outer periphery for engagement by the corresponding ribs 37 as is old and well known in the art thereby forming the rotor discs for the friction brake 10. All of the nonrotatable discs (38 through 42) and rotatable discs (44 through 47) may be made from a suitable brake material such as metal, steel or other wear-resistant material for withstanding high temperatures and providing a heat sink. The number of discs may be varied as is necessary for the application involved. The respective stator discs and rotor discs that have the circumferentially spaced openings on the inner and outer periphery may accommodate reinforcing inserts to provide reinforcement to the walls of such slotted openings and to enhance the life of such slots as is old and well known in the art. Such reinforcing inserts are also referred to as drive clips.

Figure 2:
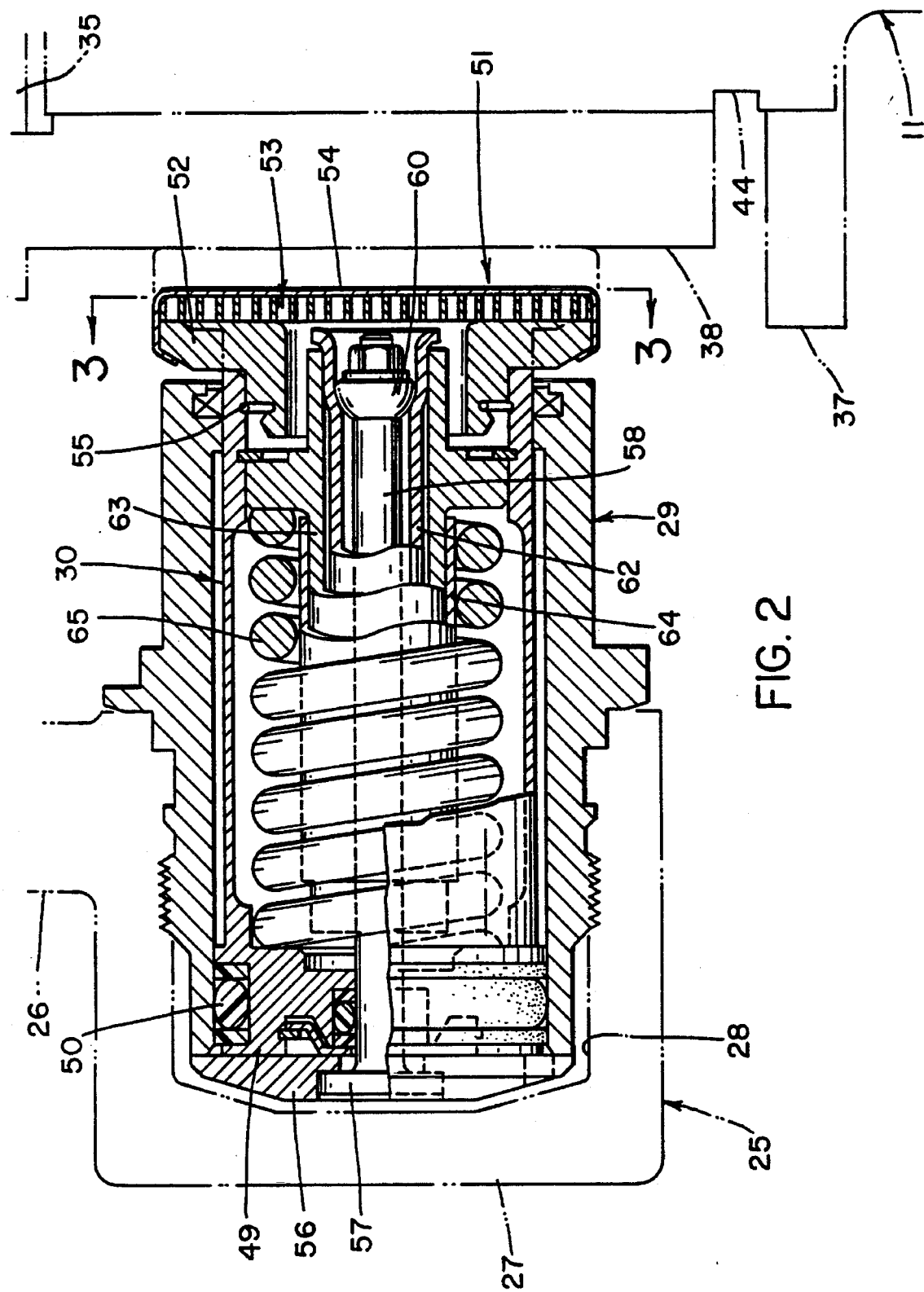
FIG. 2 is an enlarged cross-sectional view of a piston and cylinder assembly.

The pistons 30 previously referred to are all identical in structure and only one will be described. Piston 30 is a cup-shaped sleeve with a rearwardly disposed end portion 49 which is suitably recessed to receive an annular seal or packing 50 which slidingly engages the interior wall surface of cylinder 29. The other end or front end portion of piston 30 has a piston head 51 composed of a backup disc 52, a circular honeycomb insulator 53 and a thin shield or cup-shaped cap member 54. The backup disc 52 is suitably connected to the sleeve portion of piston 30 which may include press fitting thereinto and being grooved to receive a retainer ring 55. The honeycomb insulator is made up from a plurality of stacked linear metal strips which have linear walls 48 which present a corrugated pattern, such that when two strips are placed together in the manner shown in FIG. 7, the resulting pattern discloses the honeycomb structure which permits the use of a thin metal structure, yet provide exceedingly high resistance to any deformation of load. The cells produced by the honeycomb structure are non-tubular or polygonal in configuration with linear wall surfaces in contrast to tubular cells such as those made from stampings which do not provide for sufficient strength or depth of the wall surfaces. The linear wall surfaces provide greater overall open cell area over that possible under a stamping of a sheet metal that contains circular cells which would result in greater conductivity. The linear walls 48 are generally parallel to the axis of the surface of the thin shield or cap member 54. The cup-shaped cap member or thin heat shield 54 is employed in the containment of the honeycomb 53. The shield 54 is thin in cross section to reduce the weight of the piston head. Thin as shown and defined herein is having little extent from one surface to its opposite surface and is particularly significant when considering the cross-sectional thickness of the cell walls and cap 54 to the height of the cell walls. The cell walls in their thickest section is double the wall thickness of the cap member 54 when viewed in FIG. 5. It is to be noted that FIG. 5 structural depicts the honeycomb and cap member 54 in substantially enlarged configuration to more fully illustrate the construction of the piston head. As shown in FIG. 2, the cap member 54 has its peripheral edge rolled over onto the back peripheral side of the backup disc 52, thereby connecting the honeycomb insulator to the backup disc 52. The honeycomb insulator 53 is the sole means for transferring the forces between the brake discs (38–42 and 44–47) and the backup disc 52 (and the cylindrical sleeve portion of the piston 30). The peripheral edges of the thin cross-sectioned cap 54 does not transmit any forces as its lower rolled edges do not react on any member (FIG. 2) when force is applied directly from contact with the brake discs.

To make the honeycomb structure one passes a longitudinally extending thin strip of metal through a press that deforms spaced longitudinal portions to provide alternating faces that are non-coplanar but are joined together by planar flat faces as depicted by FIG. 7 which shows two separate portions of these deformed strips. Each deformed strip has a corrugated pattern with linear walls 48 that are staggered or spaced in different planes. The first or one set of linear faces 48 are in one or a first plane while the remaining set of linear faces 48 are in a second plane which is parallel to the first plane. These two sets are joined at abutting faces as illustrated in FIG. 4 to form a honeycomb structure. To make their overall structure annular in shape in plan view, the respective lengths of the strips are dimensioned in length to assume an annular shape when joined on their flat surfaces by the use of adhesives, cement, brazing and/or welding. The cells produced by this process are non-tubular and have one set of end edges abutting the backup disc 52 and the other set of end edges abutting the thin shield or cup-shaped cap member 54. As previously stated, thin as referred to means it has little extent or linear dimension from one surface to its opposite surface and especially when considering its dimension to the height of the linear walls 48 of the honeycomb structure. Of particular significant in this construction is that the structure provides excellent compressive strength to weight ratio while being effective as an insulator.

The end wall portion of cylinder 29 as shown in FIG. 2 is designated 56 and receives the enlarged head 57 of a rod 58 that extends through the rearwardly disposed end portion 49 of the piston 30. The other end of rod 58 has a hardened ball 60 secured thereto as by a nut for engagement with a deformable tubular member 62 which in turn is connected to tubular members 63 and 64 which are encompassed by a compression spring 65 to facilitate compensation of wear of the brake discs. The area between the end wall portion 56 of cylinder 29 and the rearwardly disposed end portion 49 of piston 30 define a chamber which receives pressurized fluids from a suitable pressure source via inlet conduits to move the piston 30 and the piston head 51 against the pressure plate 38 to effect a braking action of the brake stack wherein the interleaved stator and rotor discs are frictionally engaged with each other and against the end stator disc 42, which action generates a tremendous heat buildup. The thin heat shield or cap member 54 with its honeycomb insulator 53 and backup disc 52 effectively and efficiently provides a heat barrier for the actuating fluid behind the piston 30. The chamber behind piston 30 is relieved of pressure by a suitable outlet valve and conduit means to allow for the return of the piston 30 to this inoperative position. This thin cross-sectional thickness of the thin shield or cup-shaped cap member 54 eliminates the storing of heat energy which is expressed as a thin cross-sectioned cap wherein thin is defined as having little extent from one surface to its opposite surface. The honeycomb insulator has its cells with linear non-tubular walls which reduces materially the conducting area for heat transfer when compared to a honeycomb structure that is made from a stamping that defines a plurality of tubular cells. In the case of stamping a metal plate, the thickness of the punching of the bores or hole to create the cells limits substantially the length or thickness of the cells.

Various modifications are contemplated and may obviously be resorted to by those skilled in the art without departing from the described invention, as only a preferred embodiment thereof has been described.

I claim:

1. The method of making a honeycomb piston head structure comprising the steps of: deforming longitudinally spaced portions of longitudinally extending thin strips of metal that have substantial width compared to their thickness in a direction generally normal to their longitudinal axes; joining said deformed strips to form a honeycomb structure that has a plurality of cells and oppositely disposed sets of end edges; locating an end cap having oppositely disposed surfaces against said honeycomb structure with one surface contacting one set of end edges of said honeycomb structure; positioning a plate on the other set of end edges of said honeycomb structure; and fastening said end cap to said plate by rolling an end edge of said end cap over and into abutting contact with the peripheral edge of said plate, such that said honeycomb structure is captured between said end cap and said plate to form a piston head structure, said end cap being the sole means for interconnecting said honeycomb structure to said plate, thereby making said honeycomb structure the sole means for transmitting forces from said end cap to said plate.

2. The method of making a honeycomb piston head structure as set forth in claim 1 wherein said deforming creates adjacent non-coplanar faces in each strip.

3. The method of making a honeycomb piston head structure as set forth in claim 2 wherein said deforming creates a first set of faces in each strip that lie in parallel planes and a second set of faces in each strip that lie in non-coplanar planes.

4. The method of making a honeycomb piston head structure for a piston that is actuated by hydraulic fluids comprising the steps of: deforming longitudinally spaced portions of longitudinally extending thin strips of metal in directions generally normal to their longitudinal axes; joining said deformed strips to form a honeycomb celled structure with two sets of oppositely disposed end edges; locating an end cap against said honeycomb structure in abutting contact with one set of end edges of said honeycomb structure; positioning a plate that is secured to said piston into abutting contact with the other set of end edges of said honeycomb structure; and rolling an end edge of said end cap over the peripheral edge of said plate to interconnect said end cap to said plate and said piston with said honeycomb structure captured therebetween, to isolate the hydraulic fluid acting on said piston and said plate from said end cap, said honeycomb structure being the sole means for transmitting forces from said end cap to said plate and said piston.

* * * * *